United States Patent
Su et al.

(10) Patent No.: US 7,697,697 B2
(45) Date of Patent: Apr. 13, 2010

(54) APPARATUS FOR AUTOMATIC IDENTIFICATION OF AUDIO INPUT/OUTPUT DEVICE AND METHOD THEREOF

(75) Inventors: Chu-Ting Su, Hsinchu (TW); Yi-Shu Chang, Tainan (TW); Wen-Chi Wang, Siluo Township, Yunlin County (TW)

(73) Assignee: Realtek Semiconductor Corp., Hsinchu (TW)

( * ) Notice: Subject to any disclaimer, the term of this patent is extended or adjusted under 35 U.S.C. 154(b) by 1170 days.

(21) Appl. No.: 10/661,492

(22) Filed: Sep. 15, 2003

(65) Prior Publication Data

US 2004/0080440 A1 Apr. 29, 2004

(30) Foreign Application Priority Data

Sep. 20, 2002 (TW) ............................... 91121584 A

(51) Int. Cl.
*H04R 1/10* (2006.01)

(52) U.S. Cl. ........................ 381/74; 381/123; 700/94

(58) Field of Classification Search ................ 381/123, 381/74, 77, 11–12, 1, 87, 309, 300; 700/94; 341/141; 327/355; 439/668–669
See application file for complete search history.

(56) References Cited

U.S. PATENT DOCUMENTS

| 3,562,428 | A  * | 2/1971 | Starkey et al. ................. 381/98 |
| 6,122,369 | A  * | 9/2000 | Hwang et al. .......... 379/420.04 |
| 6,203,344 | B1 * | 3/2001 | Ito ............................. 439/218 |
| 6,397,087 | B1 * | 5/2002 | Kim et al. ................. 455/569.1 |
| 6,407,633 | B1 * | 6/2002 | Dao ........................... 330/86 |
| 6,594,366 | B1 * | 7/2003 | Adams ........................ 381/74 |
| 6,934,400 | B1 * | 8/2005 | Vonlanthen ................. 381/320 |
| 2004/0081099 | A1 * | 4/2004 | Patterson et al. ............ 370/241 |

* cited by examiner

Primary Examiner—Vivian Chin
Assistant Examiner—Lun-See Lao
(74) Attorney, Agent, or Firm—Thomas, Kayden, Horstemeyer & Risley

(57) ABSTRACT

An apparatus and method of automatic identification an external audio input/output device. The external device connected to an audio jack is identified as an audio output or input device, according to the impedance thereof. Furthermore, the present invention automatically selects the most suitable internal circuit to connect to the external device.

16 Claims, 10 Drawing Sheets

|  | Impedance | DCVOL1 (R2.2K) | DCVOL2 (R47K) | DCVOL3 (R100K) | Recognized Condition |
|---|---|---|---|---|---|
| Power Speaker1 | 10K~100K | 13~15<br>2.05V~2.45V | 2~10<br>0.44V~1.7V | 15<br>2.47V~2.49V | DCVOL1>10<br>2<=DCVOL2<=9<br>DCVOL3>10 |
| Power Speaker2 | 100~150 | 0~1<br>0.11V~0.16V | 0<br>0.005V~0.008V | 8~9<br>1.25V~1.5V | DCVOL1<5<br>DCVOL2<2<br>1<DCVOL3<10 |
| Earphone | 20~50 | 0<br>0.02V~0.05V | 0<br>0.001V~0.002V | 2~5<br>0.42V~0.83V | DCVOL1<5<br>DCVOL2<2<br>1<DCVOL3<10 |
| Microphone | 500~3k | 3~9<br>0.46v~1.44v | 0~1<br>0.026v~0.15v | 13~15<br>2.08v~2.42v | 5<=DCVOL1<=10<br>DCVOL2<2<br>DCVOL3>10 |
| CD-ROM (LINE-In) | Infinite | 15<br>2.5V | 15<br>2.5V | 15<br>2.5V | DCVOL1>10<br>DCVOL2>9<br>DCVOL3>10 |
| Player (LINE-In) | Infinite<br>0<br>100K | 15<br>0<br>15 | 15<br>0<br>15 | 15<br>0<br>15 | Others |

FIG. 6

| Inputs | | | | | | Outputs | | | | | | | |
|---|---|---|---|---|---|---|---|---|---|---|---|---|---|
| $\overline{G2A}$ | $\overline{G2A}$ | G1 | A | B | C | $\overline{Y0}$ | $\overline{Y1}$ | $\overline{Y2}$ | $\overline{Y3}$ | $\overline{Y4}$ | $\overline{Y5}$ | $\overline{Y6}$ | $\overline{Y7}$ |
| H | X | X | X | X | X | H | H | H | H | H | H | H | H |
| X | H | X | X | X | X | H | H | H | H | H | H | H | H |
| X | X | L | X | X | X | H | H | H | H | H | H | H | H |
| L | L | H | L | L | L | L | H | H | H | H | H | H | H |
| L | L | H | H | L | L | H | L | H | H | H | H | H | H |
| L | L | H | L | H | L | H | H | L | H | H | H | H | H |
| L | L | H | H | H | L | H | H | H | L | H | H | H | H |
| L | L | H | L | L | H | H | H | H | H | L | H | H | H |
| L | L | H | H | L | H | H | H | H | H | H | L | H | H |
| L | L | H | L | H | H | H | H | H | H | H | H | L | H |
| L | L | H | H | H | H | H | H | H | H | H | H | H | L |

FIG. 7

APPARATUS FOR AUTOMATIC IDENTIFICATION OF AUDIO INPUT/OUTPUT DEVICE AND METHOD THEREOF

BACKGROUND OF THE INVENTION

1. Field of the Invention

The present invention relates to an audio jack, and in particular to an audio jack for automatic identification of an external audio input/output device and a method thereof.

2. Description of the Related Art

Most personal computers and notebooks have at least two audio jacks, one for audio input, and another for audio output. Audio jacks are typically very small, and hence it is difficult to label it clearly to allow users to distinguish between audio input and output. Users often make the mistake of plugging the external devices into the wrong audio jacks, for example, plugging an input device in an output audio jack. Mismatching the external device and the audio jack causes inconvenience to the users.

In another aspect, the size of ordinary notebooks has become smaller and smaller as a result of computer technology development. A further limitation for notebooks to reduce size is that at least two audio jacks are required for audio input and audio output respectively. Thus, reducing the number of audio jacks required in notebooks increases available space, allowing further reduction in the size thereof.

SUMMARY OF THE INVENTION

An object of the invention is to provide an apparatus and a method thereof for automatic identification of an external audio input/output device. Another object of the invention is to reduce the number of necessary audio jacks in personal computers and notebooks. Yet another object of the invention is to decrease the occupied space needed in the circuit board.

In order to achieve the objects, the present invention proposes an apparatus which can identify audio input and output automatically. The apparatus comprises an audio jack, a detecting device, and a multiplexer. The audio jack is connected to an external device. The detecting device determines the type of the external device by measuring impedance, and generates a control signal as its output. The multiplexer governs the connection between the audio jack and a plurality of circuits. The control signal directs the audio jack to make connection to a proper circuit out of the plurality of circuits.

The connection between the detecting device and the external device constitutes a potential divider, and the control signal comes from the voltage at the dividing point of the potential divider. To clearly distinguish among various impedance values, the detecting device selectively provides one of a plurality of resistances to match the impedance of the external device to constitute a potential divider.

The control signal is converted into digital data by an analog to digital converter (ADC).

After determining the type of the external device, the digital controlling unit intercepts the connection between the detecting device and the external device.

The invention also proposes an automatic identification method. The first step is to detect if an external device has been inserted in an audio jack. The second step is to measure the impedance of the external device and convert the impedance value into a corresponding control signal. The final step is to selectively connect one of a plurality of circuits to the external device through the audio jack according to the control signal.

In order to better understand the objects, characteristics, and advantages of the present invention, a detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 6 is a table showing the voltage specifications for various audio devices; and FIG. 7 is a truth table of MMT74HCT138.

DETAILED DESCRIPTION OF THE INVENTION

First Embodiment

Figure 1:
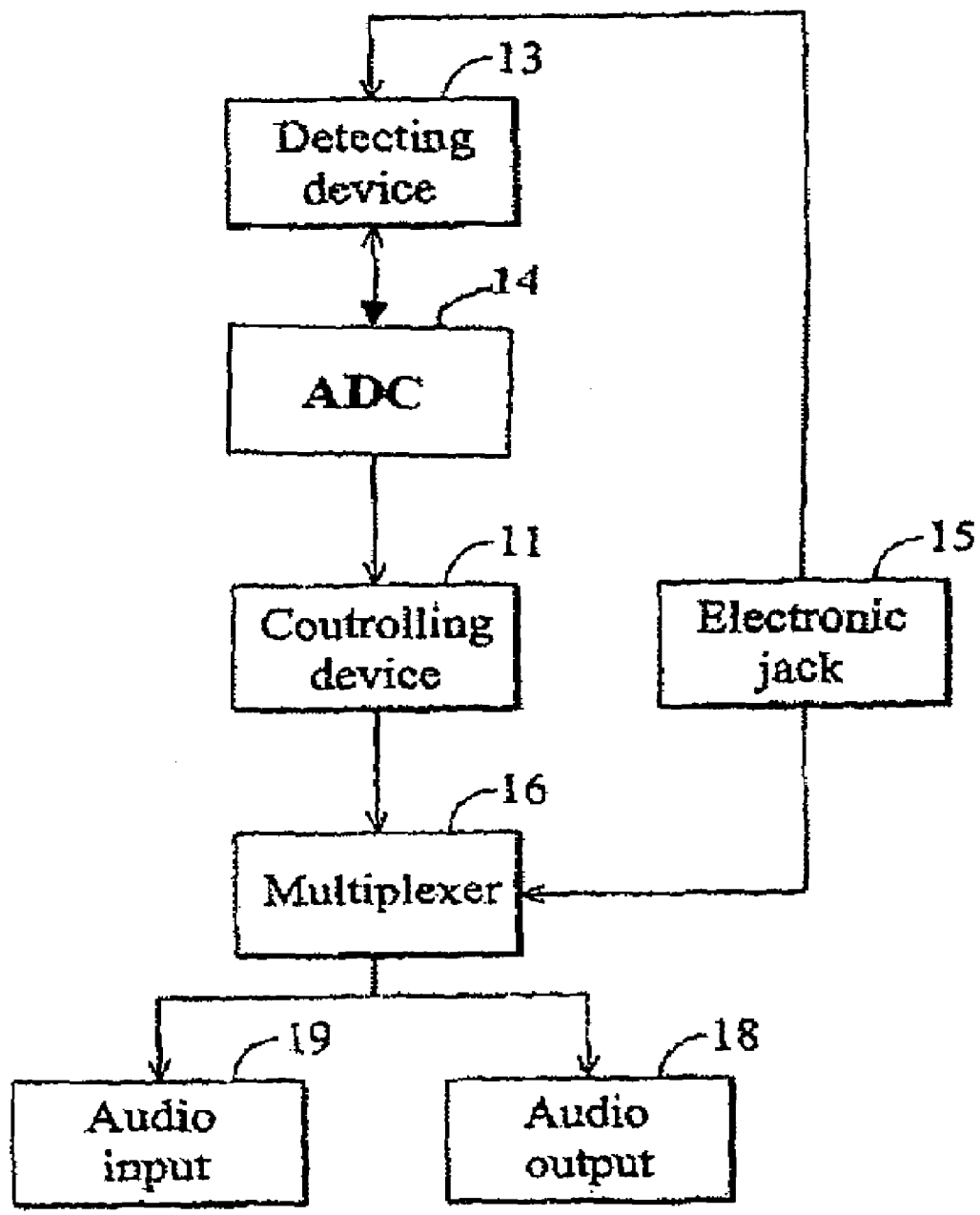
FIG. 1 is a block diagram of the first embodiment of the invention.

FIG. 1 is a block diagram of the first embodiment of the present invention. Accordingly, the apparatus for automatic identification of an audio input/output device includes at least an audio jack 15, a controlling device 11, a detecting device 13, and a multiplexer 16.

The detecting device 13 is for determining the impedance of the external device connected to the audio jack 15. Multiplexer 16 is for selecting one of a plurality of circuits (for example, audio input 19, or audio output 18) to connect with the external device. The controlling device 11 is for controlling the operation of all devices.

After the controlling device 11 determines the type of the external device according to the voltage measured by the detecting device 13, multiplexer 16 selects the operation of the apparatus to treat the external device as either an audio output device or an audio input device.

Figure 2A:
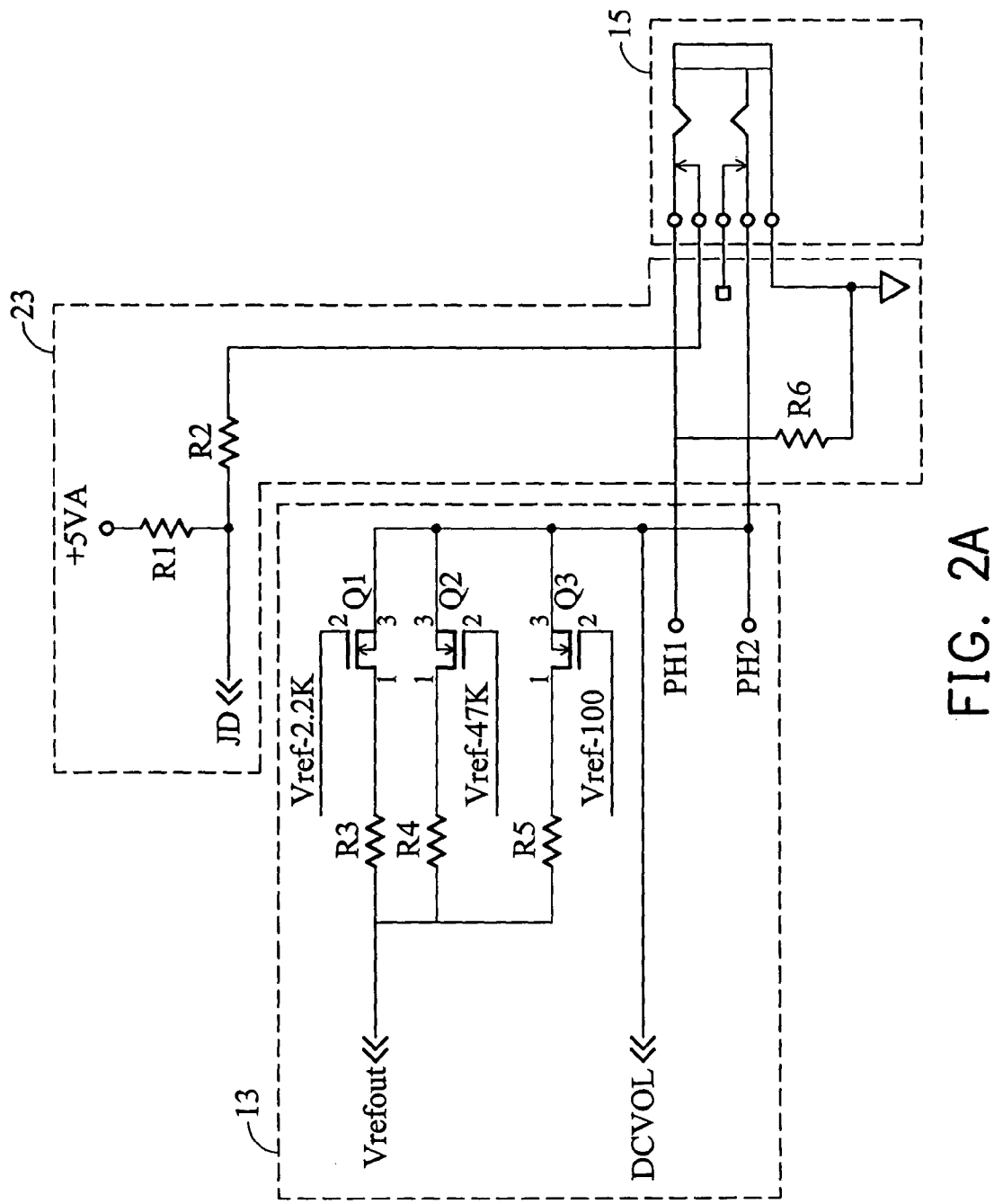
FIG. 2A shows the detecting device and the audio jack with a connecting detection circuit from FIG. 1.

FIG. 2A shows a circuit diagram of the detecting device 13, and the audio jack 15, as well as a connecting detection circuit 23. The connecting detection circuit 23 is for detecting whether there is an external device connected to the audio jack 15. The detecting device 13 comprises three resistors (R3~R5), three transistors (Q1~Q3), and a voltage source (Vrefout). When the external device is connected to the audio jack 15, the transistors Q1~Q3 are turned on sequentially, in order to make series connections between each of the resistors R3~R5 and the impedance of the external device connected to the audio jack 15 individually, thereby obtaining three voltages at the dividing point of the external impedance sequentially. The three voltages at the dividing point are converted into three digital signals through an analog to digital converter (ADC) 14. Eventually, the three digital signals are sent to the controlling device 11 as a basis for I/O determination.

The controlling device 11 detects the type of the external device through detecting the impedance of the connected external device. The controlling device 11 sends a signal to multiplexer 16 once the type of the external device is determined. The multiplexer 16 connects the external device to the audio input 19 if the external device is determined to be an input source. Examples of such input sources are microphones (MIC-In) and sound source inputs (Line-In). The multiplexer 16 connects the external device to the audio output 18 if the external device is determined to be an output source. Examples of such output sources are speakers and earphones.

Figure 2B:
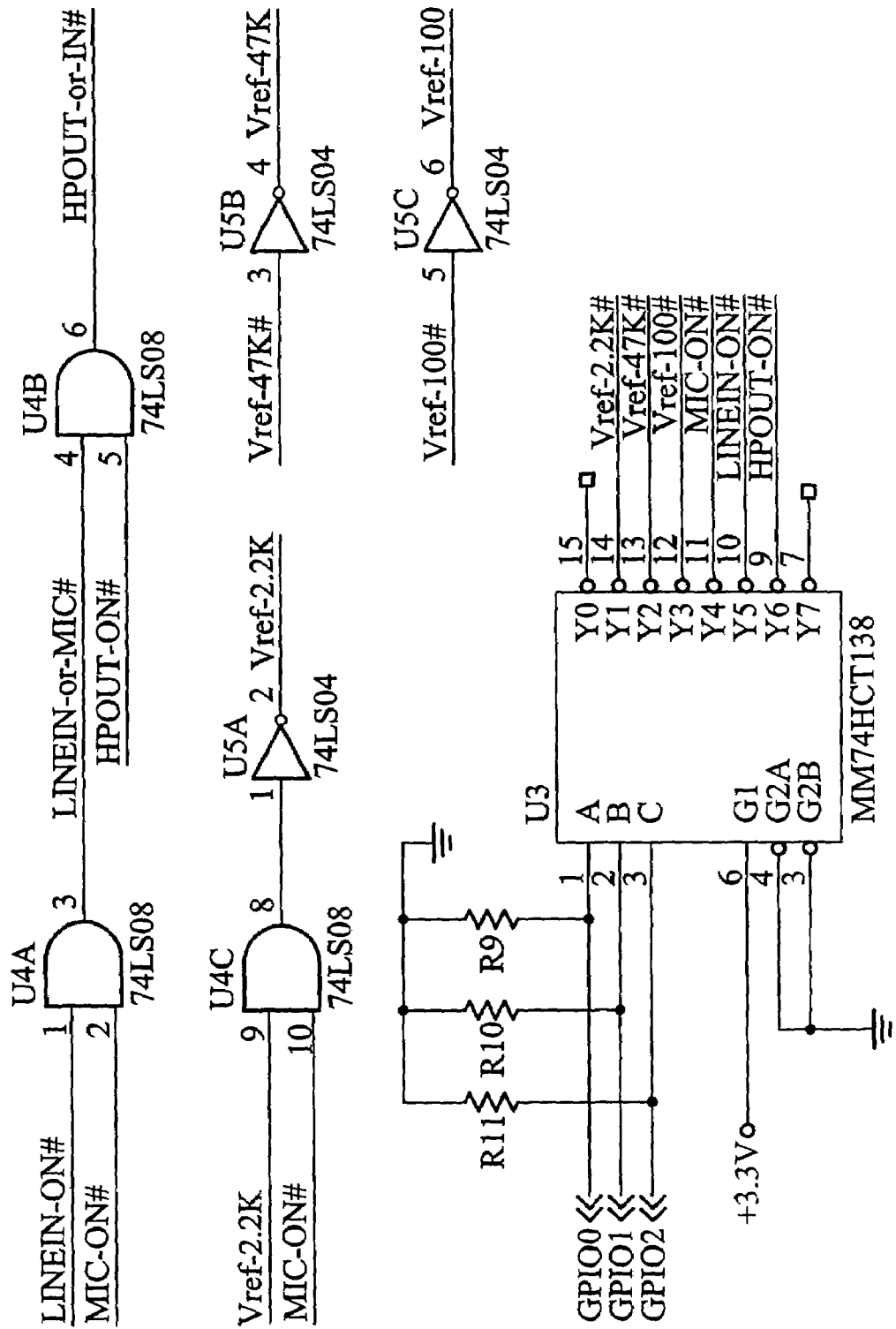
FIG. 2B shows the decoding device from FIG. 1.

The output signal of the controlling device 11 can first feed into a decoding device 12, and then couple to the detecting device 13 and the multiplexer 16, in order to reduce the number of outputs of the controlling device 11. As shown in FIG. 2B, the decoding device 12 can be a 3 to 8 decoder (3×8 decoder).

As shown in FIG. 2A, the JD signal stays low (abbreviated as L) when the external device is not yet connected to the audio jack 15; whereas the JD signal changes from L to high (abbreviated as H) when the external device is connected to the audio jack 15.

Figure 3:
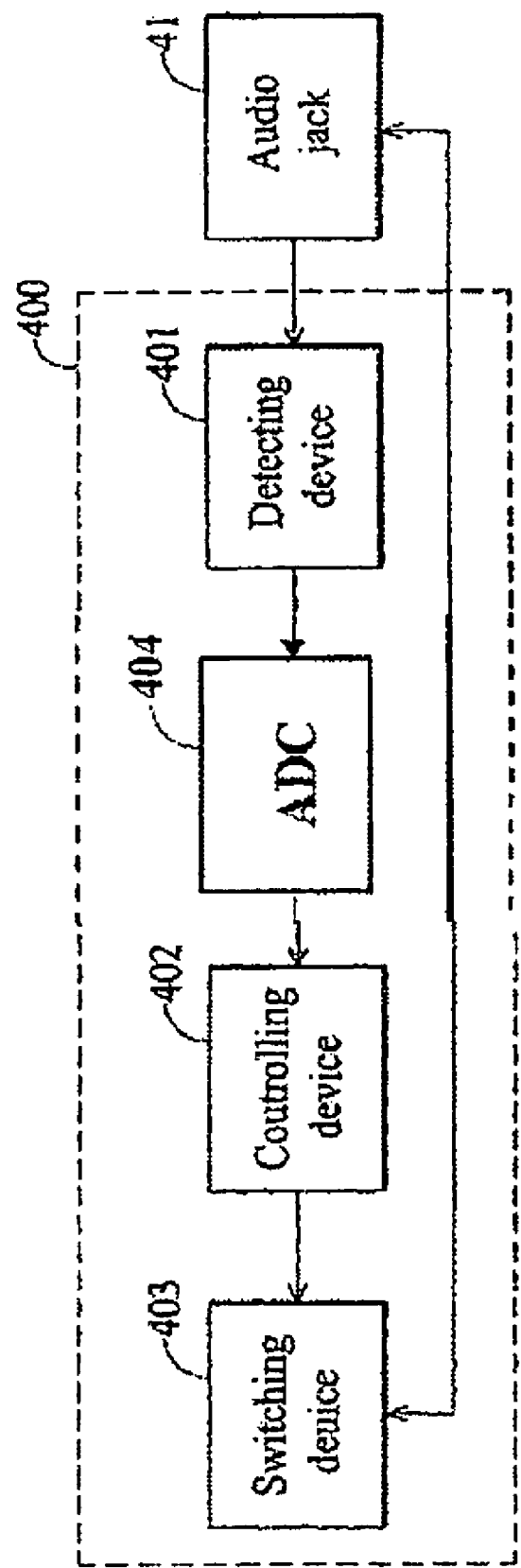
FIG. 3 is a block diagram of the second embodiment of the invention.

When the controlling device 11 detects the JD signal changing from L to H, the controlling device 11 sends signals GPIO0, GPIO1, and GPIO2 shown in FIG. 2B to a 3×8 decoder U3, such as MM74HCT138, enabling the inputs by setting G1 as H, G2A and G2B as L. The signals GPIO0, GPIO1, and GPIO2 feed to A, B, and C of the 3×8 decoder U3, controlled by the controlling device 11. When the external device is connected to the audio jack 15 of FIG. 2A, the signals GPIO2, GPIO1, and GPIO0 of FIG. 2B are L, L, and H respectively, which sets output Vref-2.2K#(Y1) of the 3×8 decoder U3 as L, and all other outputs (Y2~Y6) as H, then feeds the outputs to an AND gate U4C. The output MIC-ON# (Y4) of the 3×8 decoder U3 is L, which sets Vref-2.2K as H, and turns on the transistor Q1 in FIG. 2A, as well as series connecting the resistor R3 in FIG. 2A with the impedance of the external device. By providing a constant voltage Vrefout, divided by the two resistors connected in series, the first voltage dividing value of the external impedance can be computed accordingly. The system then feeds the first voltage dividing value into the controlling device 11 through the signal line DCVOL.

Similarly, controlling device 11 can alter the signals GPIO2, GPIO1, and GPIO0 to set any of the outputs Vref-47K# (Y2) and Vref-100# (Y3) of the 3×8 decoder U3 as L separately, and accordingly turning Q2 and Q3 ON, sequentially. The resistor R4 forms series connection with the external impedance when Q2 turns ON; and the resistor R5 forms series connection with the external impedance when Q3 turns ON. The second and the third voltage dividing values can therefore be generated, then feeding the three voltages dividing values into the controlling device 11 through the signal line DCVOL.

The type of the external device can be determined by a software program when the controlling device 11 obtains the first, second, and third voltage dividing values, with the process of the software program explained later.

Figure 2C:
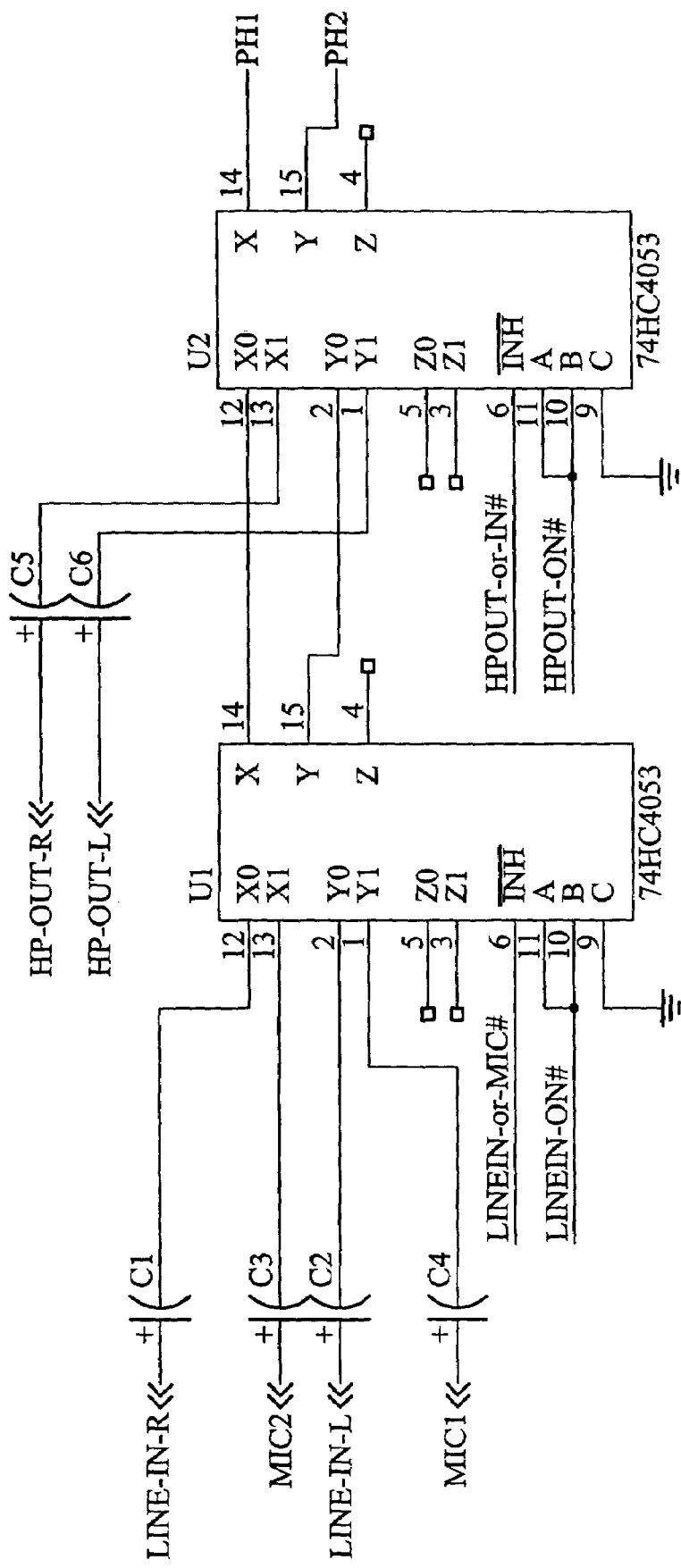
FIG. 2C shows the multiplexer from FIG. 1.

The controlling device 11 sends an enabling signal to the external device through the 3×8 decoder U3 when it determines the type of the external device. For example, when the controlling device 11 determines the external device is a microphone (MIC) using the first, second, and third voltage dividing values, the controlling device 11 sets the output MIC-ON#(Y4) as L, and all other outputs as H. This signal keeps Q1 of FIG. 2A to remain ON to continuously provide DC power to the microphone. In another aspect, such signal is also the input of the multiplexer integrated circuit (IC) U1 and U2 in FIG. 2C. FIG. 2C shows the multiplexer 16 in FIG. 1. The multiplexer IC U1 and U2 send the signals PH1 and PH2 (PH1 and PH2 are the AC signals from the microphone) to MIC1 and MIC2. MIC1 and MIC2 connect to the input circuit of the MIC signal.

Note that, once the controlling device 11 determines that the external device is a speaker or sound source input, it turns off the resistors Q1, Q2, and Q3 in FIG. 2A through the decoder 12 in FIG. 2B, to disconnect the connection between the detecting circuit 13 and the audio jack J1.

Second Embodiment

The apparatus of the present invention can adhere to Audio Codes'97 (AC'97) standard, thus not requiring extra hardware space for implementation.

AC'97 is a standard established in 1997 for providing high quality sound for personal computers. AC'97 separates audio signals into two parts, digital and analog, providing the following advantages. Separating audio signals, provides high quality output of Signal to Noise Ratio (SNR) 90 dB, and helps reduce interference. The other advantages include reduced cost and increased flexibility. Of the three standards for sound chips, AC'97 occupies the mainstream low end market. Most products using AC'97 are chips with 2 audio channels, 4 audio channels, and 6-channel chips are also available.

FIG. 3 is a block diagram of the second embodiment of the present invention. As shown in the diagram, the detecting device 401 and the switching device 403 are integrated into AC'97 chip 400. When AC'97 chip 400 detects an external device connected to the audio jack 41, the detecting device 401 measures the voltage values corresponding to the impedance of the external device, and sends the measurements to chip 400 for determination, after which AC'97 chip 400 enables the switching device 403 to control connections between the audio jack 41 and other circuits.

Figure 4:
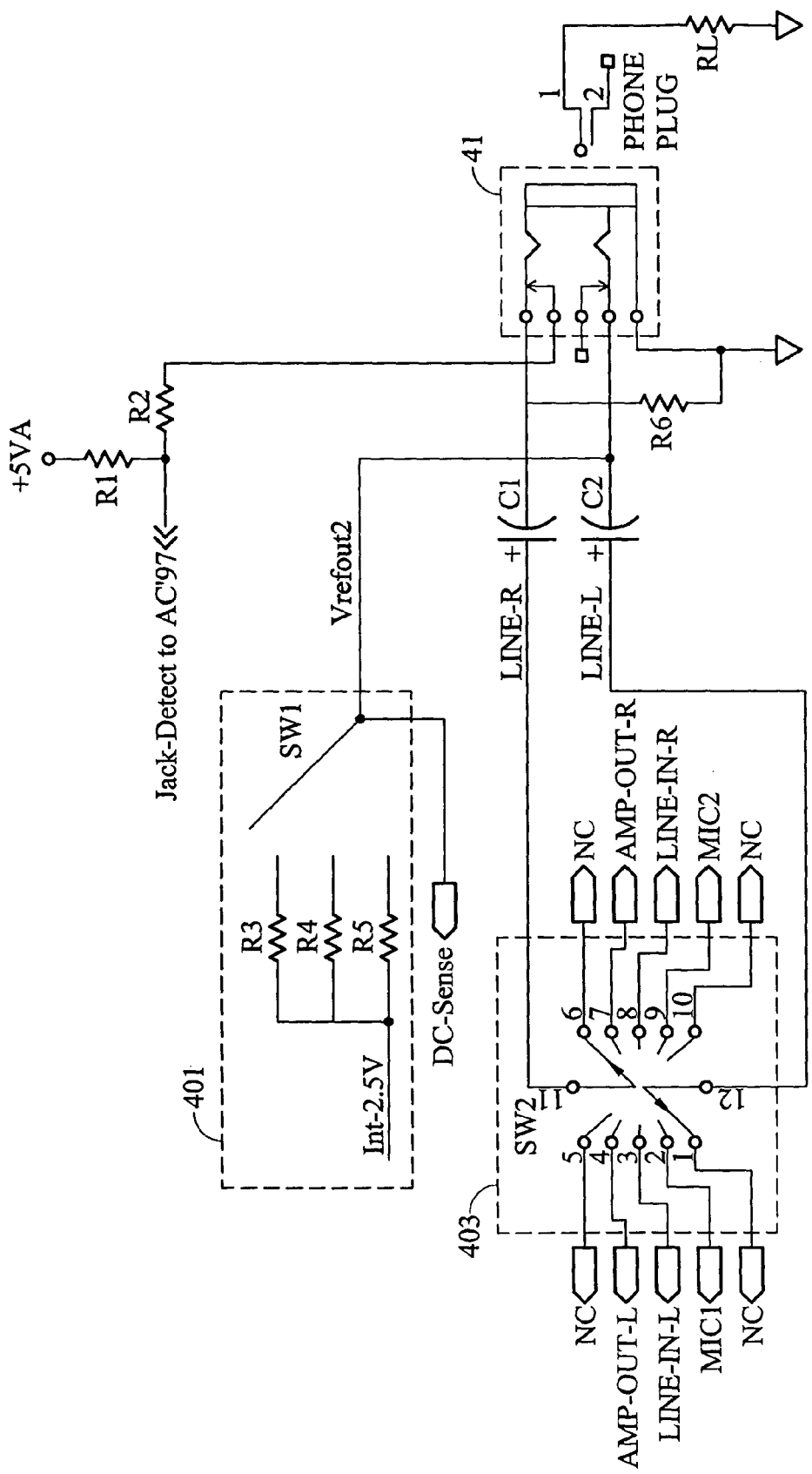
FIG. 4 is a circuit diagram of the second embodiment of the invention.

FIG. 4 is a circuit diagram of the second embodiment of the invention. As shown, the detecting device 401 comprises three resistors (R3~R5) and a switch (SW1), and the detecting device 401 separately connects the three resistors (R3—R5) with the impedance of the external device in series, and ten sends the corresponding voltage values sequentially to an analog-to-digital converter (ADC) 404 and a controlling device 402 (as shown in FIG. 3) of AC'97 chip 400 for determination. In the present embodiment, the type of the external device determination is accomplished by die software program.

After determining the type of the external device connected to audio jack 41, chip 400 controls the switching device 403 to output the corresponding signal to the audio jack 41.

If Vrefout in FIG. 2A is 2.5V, and the resistors (R3~R5) are 2.2K, 47K, and 100 ohm respectively, the circuit measures the impedance of the external device carefully using three resistors of different values. FIG. 6 is a table showing the voltage dividing values and the recognized condition for different audio devices. FIG. 6 also shows the range of the 4-bit digital numbers corresponding to each of the voltage dividing values.

As shown in FIG. 6, the impedances of various speakers can be roughly divided into 10K~100K and 100~150 ranges.

If the external device is speaker 1 (impedance 10K~100K), the first resulting voltage dividing value is about 2.05V~2.45V when speaker 1 makes series connection with R3, the first voltage dividing value also corresponds to 13~15 when the voltage value is converted to a 4-bit digital number. The ranges of the second and the third voltage dividing values, as well as the corresponding digital numbers can be computed in a similar manner. Consequently, the recognized condition in the sixth column can determine the type of the external device.

For example, if the corresponding digital numbers of the first, second, and third voltage dividing digital values are 14, 8, and 15 respectively, the external device can be identified as speaker 1 with impedance value in the range of 10K~100K by looking up the sixth column in FIG. 6. Then the connection can be controlled according to this identified result.

Figure 5A:
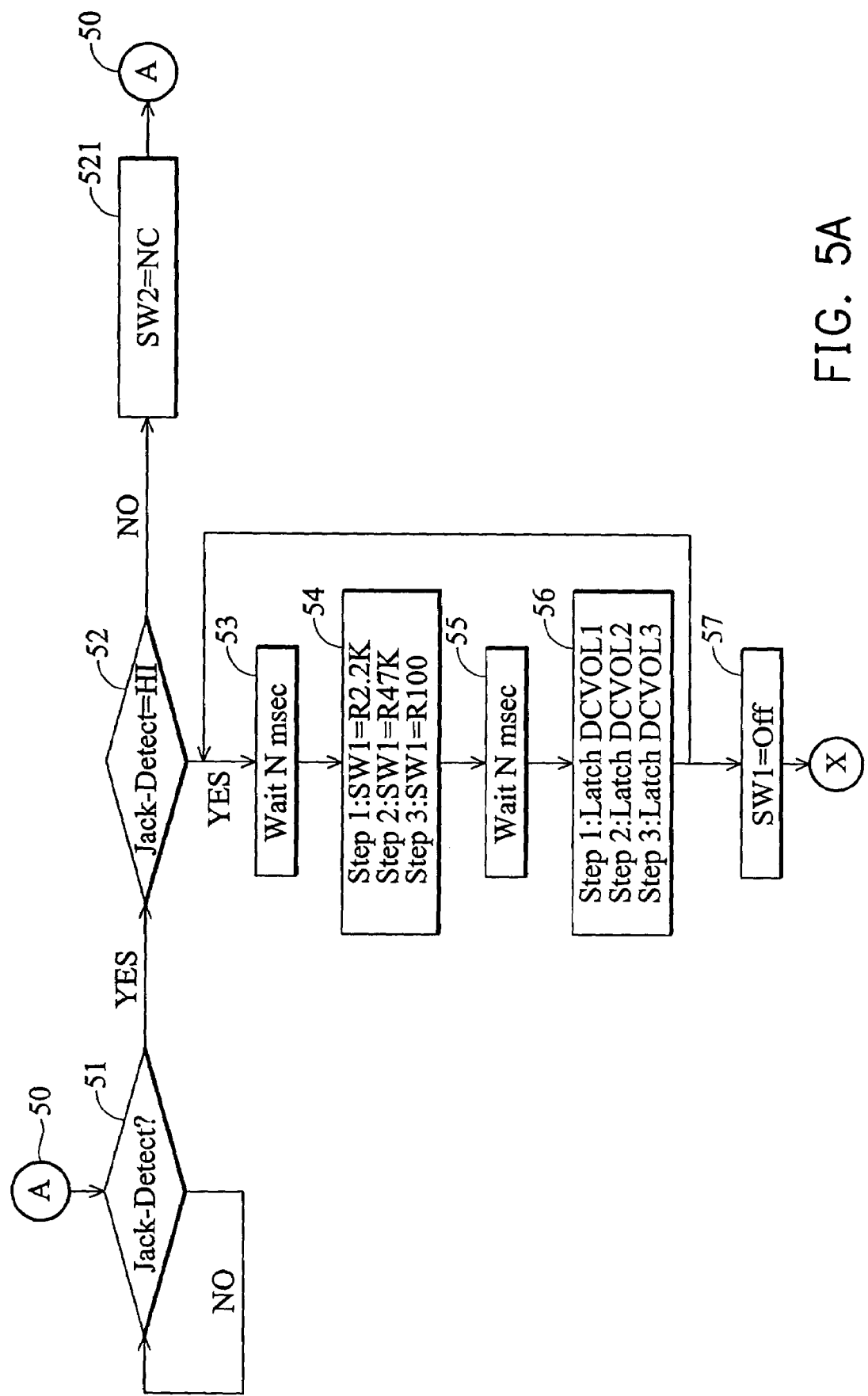
FIGS. 5A and 5B are flow diagrams of audio input and output determination.
Figure 5B:
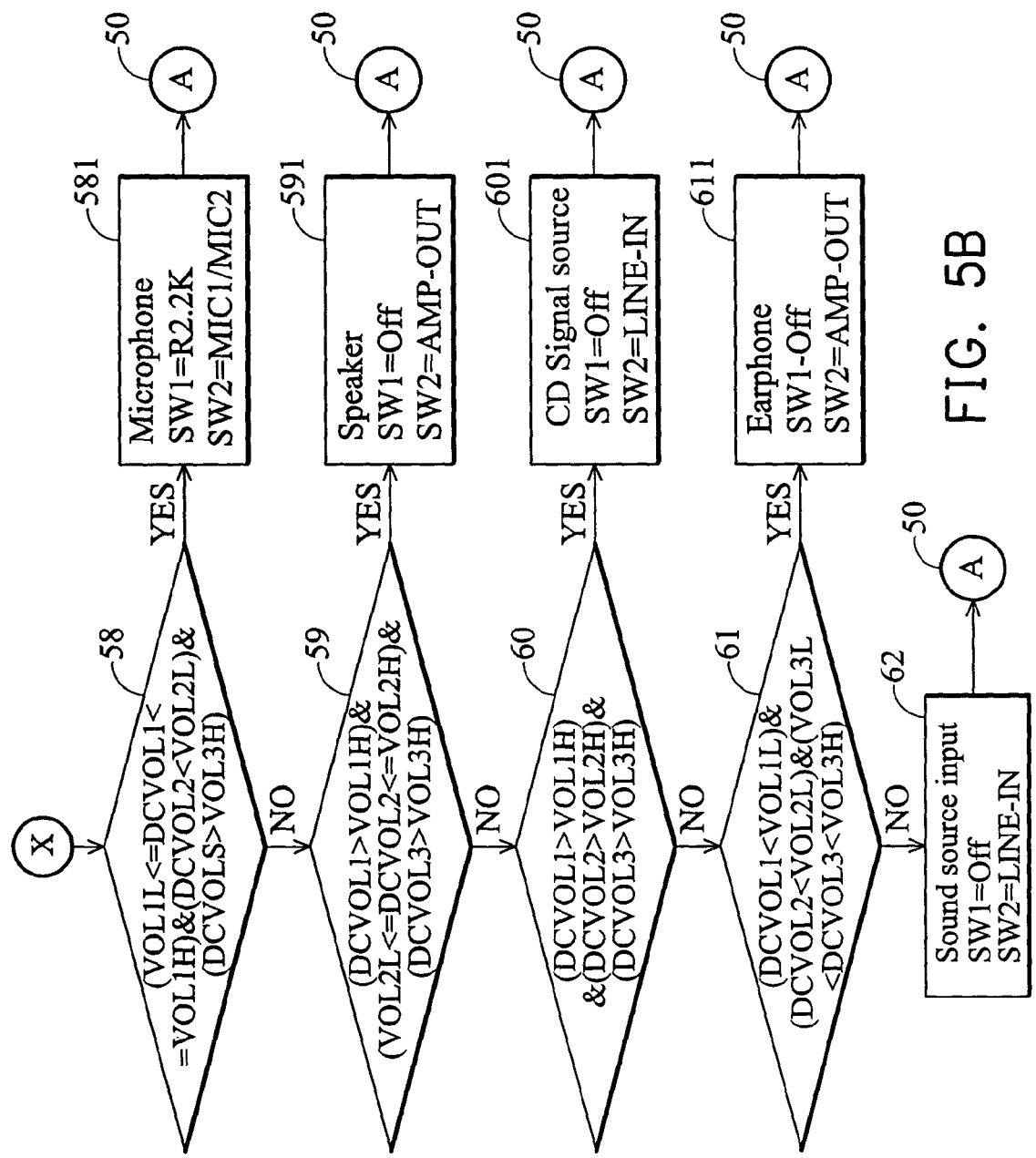

The following paragraphs describe the process of software determination in FIG. 5A and FIG. 5B.

For example, the external device connected to audio jack can be a speaker with input impedance of 10K. Step 50 is the start of the software program, step 51 determines if there is an external device connected to the audio jack (Jack-Detect), and the program goes to step 52 if Jack-Detect is successful, otherwise the process returns to step 50, and continues to perform Jack-Detect.

The audio jack signal changes from L to H when the external device is connected to the audio jack, setting the Jack-Detect signal as H. In step 52, the program checks if the Jack-Detect signal is H, if not, the process goes to 521, indicating no device is connected, and returns to step 50 to continue Jack-Detect.

Once detecting the Jack-Detect signal as H, the program executes step 53 to wait N milliseconds (msec), a step included in the program to balance the different time delays of the components in the system.

After waiting N msec, the program goes to step 54, setting series connection between resistor R3 in FIG. 2A (or FIG. 4) with the impedance of the external device to obtain the first voltage dividing value of the external impedance, converts the first voltage dividing value into digital value DCVOL1, and goes to step 55 to wait N msec, fixes DCVOL1 in step 56, and returns to step 53.

After again waiting N msec, the program goes to step 54, setting series connection between resistor R4 in FIG. 2A (or FIG. 4) with the impedance of the external device to obtain the second voltage dividing value of the external impedance, converts the second voltage dividing value into digital value DCVOL2, goes to step 55 to wait N msec, fixes DCVOL2 in step 56; and goes back to step 53.

After waiting N msec for a third time, the program goes to step 54, setting series connection between resistor R5 in FIG. 2A (or FIG. 4) with the impedance of the external device to obtain the third voltage dividing value of the external impedance, converts the third voltage dividing value into digital value DCVOL3, goes to step 55 to wait N msec, and then fixes DCVOL3 in step 56.

After obtaining the digital values (DCVOL1, DCVOL2, DCVOL3) of the first, second, and third voltage dividing value, the process goes to 57 to set Verf-2.2K, Vref-47K, and Vref-100 in FIG. 2A as H, or disconnects the switch SW1 in FIG. 4, and executes step 58.

Steps 58, 59, 60, and 61 are standards for determination based on the possible ranges of voltage dividing values in FIG. 6. For example, if the program executes steps 58, 59, 60, and 601 according to the first, second, and third voltage dividing values, the external device is a CD signal source (line-out). The program then executes the signal communication in step 50. The recognition parameters VOL1L, VOL1H, VOL2L, VOL2H, VOL3L, and VOL3H in FIG. 5B are programmable, and can be stored in any ordinary register, programmable memory, or software file, to make modifications of the recognition parameters easily. FIG. 7 is the truth table of the decoder U2 in FIG. 2, wherein H represents High voltage level, L represents Low voltage level, and x represents "don't care".

The present invention only requires one audio jack for both audio input and audio output, and automatically identifies the type of a connected external device such that users are no longer required to differentiate between audio jacks.

Implementing two audio jacks with the inventive automatic identification of input and output provides different benefits for different users. For example, two audio jacks can both be used as inputs, or as outputs, or one for input and another for output.

The present invention greatly saves the space required by a circuit board by integrating the functional elements on-chip. When the external device is an uncommon type, the preset upper and lower limits of the three voltage dividing values can be reset by software programming to meet impedance requirements. This solves the problems caused by mismatching preset recognizing ranges and the external devices.

While the invention has been described by way of examples and in terms of the embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An apparatus for automatically determining a type of an external device, comprising:
   a jack for coupling the external device;
   an impedance detecting circuit, coupled to the external device through the jack, for generating a first analog signal according to an impedance of the external device and a first resistance, a second analog signal according to the impedance of the external device and a second resistance and a third analog signal according to the impedance of the external device and a third resistance, wherein the first, second and third resistances are different;
   an analog-to-digital converter, coupled to the impedance detecting circuit, for converting the first, second and third analog signals to first, second and third digital values, respectively; and
   a control circuit, coupled to the analog-to-digital converter, for determining the type of the external device when the first digital value falls within a first predetermined range, the second digital value falls within a second predetermined range, the third digital value falls within a third predetermined range and all of the first, second and third predetermined ranges together indicate a same recognized condition among a plurality of predetermined recognized conditions;
   wherein the impedance detecting circuit comprises a plurality of resistors, which couples together in parallel, for providing the first, second and third resistance and each of the first, second and third digital values is a multi-bit number.

2. The apparatus of claim 1, wherein the impedance detecting circuit comprises:
   a switching circuit for selectively coupling at least one of the resistors to the external device and thereby sequentially generating a the first, second and third analog signals which are respectively converted into the first, second and third values by the analog-to-digital converter.

3. The apparatus of claim 1, wherein at least two of the first, second and third predetermined ranges are different.

4. The apparatus of claim 1 further comprising:
   a connection detecting circuit, coupled between the jack and the impedance detecting circuit, for determining whether the external device couples to the jack such that the impedance detecting circuit generates the first, second and third analog signals when the connection detecting circuit determines the external device being coupled to the jack.

5. The apparatus of claim 1, wherein the control circuit disconnects the coupling relation between the impedance detecting circuit and the jack after determining the type of the external device.

6. The apparatus of claim 5 further comprising:
a multiplexing circuit for coupling the external device to an internal circuit according to the type of the external device determined by the control circuit.

7. The apparatus of claim 1 further comprising:
a decoder, coupled to the control circuit, for receiving a first number of outputs from the control circuit and thereby generating a second number of outputs;
wherein the second number is larger than the first number.

8. A method for automatically determining a type of an external device, comprising:
providing a plurality of predetermined resistances by a plurality of resistors coupled together in parallel;
generating a first analog signal according to a first coupling relation between a the plurality of predetermined resistances and an impedance of the external device;
generating a second analog signal according to a second coupling relation, which is different from the first coupling relation, between the plurality of predetermined resistances and the impedance of the external device;
generating a third analog signal according to a third coupling relation, which is different from the first and second coupling relations, between the plurality of predetermined resistances and the impedance of the external device;
respectively converting the first, second and third analog signals to first, second and third digital values; and
determining the type of the external device when the first digital value falls within a first predetermined range, the second digital value falls within a second predetermined range, the third digital value falls within a third predetermined range and all of the first, second and third ranges together indicate a same recognized condition among a plurality of predetermined recognized conditions;
wherein each of the first, second and third digital values is a multi-bit number.

9. The method of claim 8 further comprising:
decoupling a first resistor of the plurality of resistors from the impedance of the external device before coupling a second resistor of the plurality of resistors to the impedance of the external device;
decoupling the second resistor from the impedance of the external device before coupling a third resistor of the plurality of resistors to the impedance of the external device; and
decoupling all of the plurality of resistors from the impedance of the external device after constituting the recognized condition.

10. The method of claim 8, wherein at least two of the first, second and third predetermined ranges are different.

11. An apparatus for determining a type of an external device, comprising:
a jack for coupling the external device;
an impedance detecting circuit, coupled to the external device through the jack, for generating a first analog signal according to an impedance of the external device and a first resistance, a second analog signal according to the impedance of the external device and a second resistance and a third analog signal according to the impedance of the external device and a third resistance, the impedance detecting circuit comprising:
a plurality of detecting paths coupled together in parallel, each of the detecting paths comprising a resistor and a transistor coupled together in series, and on/off conditions of the transistors determining the first, second and third resistances;
an analog-to-digital converter, coupled to the impedance detecting circuit, for converting the first, second and third analog signals to first, second and third digital values; and
a control circuit, coupled to the analog-to-digital converter, for determining the type of the external device when the first digital value falls within a first predetermined range, the second digital value falls within a second predetermined range, the third digital value falls within a third predetermined range and all of the first, second and third predetermined ranges together indicate a recognized condition among a plurality of predetermined recognized conditions;
wherein the first, second and third resistances are different and each of the first, second and third digital values is a multi-bit number.

12. The apparatus of claim 11, wherein the plurality of detecting paths comprises:
a first detecting path comprising a first resistor and a first transistor coupled in series;
a second detecting path, coupled to the first detecting path in parallel, comprising a second resistor and a second transistor coupled in series; and
a third detecting path, coupled to the first and second paths in parallel, comprising a third resistor and a third transistor coupled in series;
wherein the first resistance is determined when the first transistor is switched on and the second and third transistors are switched off, the second resistance is determined when the second transistor is switched on and the first and third transistors are switched off and the third resistance is determined when the third transistor is switched on and the first and second transistors are switched off.

13. The apparatus of claim 11 further comprising:
a connection detecting circuit, coupled between the jack and the impedance detecting circuit, for determining whether the external device couples to the jack such that the impedance detecting circuit generates the first, second and third analog signals when the connection detecting circuit determines the external device being coupled to the jack.

14. The apparatus of claim 11, wherein the control circuit disconnects the coupling relation between the impedance detecting circuit and the jack after determining the type of the external device.

15. The apparatus of claim 14 further comprising:
a multiplexing circuit for coupling the external device to an internal circuit according to the type of the external device determined by the control circuit.

16. The apparatus of claim 11 further comprising:
a decoder, coupled to the control circuit, for receiving a first number of outputs from the control circuit and thereby generating a second number of outputs;
wherein the second number is larger than the first number.

* * * * *